Nov. 11, 1969 W. E. MARTIN 3,477,251

SHAFT COUPLING DEVICE

Filed Jan. 10, 1968

*INVENTOR.*
WILLIAM E. MARTIN

BY *William A. Murray*

ATTORNEY

United States Patent Office 3,477,251
Patented Nov. 11, 1969

3,477,251
SHAFT COUPLING DEVICE
William E. Martin, P.O. Box 187,
Kewanee, Ill. 61443
Filed Jan. 10, 1968, Ser. No. 696,882
Int. Cl. F16d 3/14
U.S. Cl. 64—27                                        14 Claims

ABSTRACT OF THE DISCLOSURE

A flexible coupling device for drivingly connecting a pair of axially aligned shafts comprising a pair of coupler members mounted to rotate with the respective shafts and extending radially from the shafts, a plurality of rigid connecting elements extending between and for drivingly connecting the coupler members to one another with the elements being imbedded in rubber inserts carried by the respective members to permit the elements to yield and to permit flexing between the members, and an annular guide extending between the coupler members engaging complementary annular surfaces on the members for retaining close axial alignment between the members.

Background of the invention

This invention relates to a flexible coupling for drivingly connecting a pair of axially aligned shafts. More particularly this invention relates to a flexible coupling that is yieldable through use of connecting elements being imbedded in elastomer material that is carried by a pair of coupler members and to a metal ring that engages surfaces on the coupler members so as to retain them in proper axial alignment.

It has heretofore been known to provide a metal plate between the flanges of a pair of couplers with axially aligned openings and to supply the openings in the plate with elastomer liners. Connecting bolts extending between the couplers and plate are supported in the liners to thereby create a yieldable or flexible coupling which will automatically accommodate slight misalignment of the shafts and will yield to accommodate momentary torque overloads or shock loads. Such a device is shown and described in U.S. Patent 2,879,650, which issued to the present inventor on Mar. 31, 1959.

A problem that may occur with the above described type of couplings is created by a pair of misaligned shafts. Often in a new installation the shafts will be properly aligned. However, as the bearings become worn or the bearing supports, or even the basic framework settles or become slightly warped, the shafts will become somewhat misaligned. While in many instances such may be slight it may create a whipping action at the flexible joint which may cause early fatigue failures in the elastomer liners. If the whipping action becomes great, the flexible coupling will be unable to dampen the vibrations that are created by the action.

Summary

With the above in mind, it is the primary object of the present invention to provide mechanical guiding means between the two coupler members which will permit yielding or flexing due to torsional loads or due to relative movement between the shafts in an axial direction, will tend to dampen or eliminate whipping at the joint, and will retain the shafts in substantially axial alignment with one another.

Specifically it is the object of the invention to provide a pair of coupler members to be interconnected by bolts imbedded in rubber carried by the members and for at least one of the coupler members to have an annular axially extending surface. A ring or collar is provided that extends between the two coupler members and pilots or guides on the annular surface for retaining the two coupler members in substantially axial alignment. In one form of the invention the ring or collar is rigid and integral with one coupler member and the other coupler member has the annular surface that the ring or collar pilots on.

In the other forms of the invention, both coupler members have annular axially extending surfaces and the ring or collar extends between the pilots on both surfaces.

Brief description of the drawings

Referring now to FIGS. 1 and 2, the coupling device is adapted to drivingly connect a pair of axially aligned shafts 10, 11. A pair of coupler members 12, 13 have hub portions 14, 15 adapted for mounting on the respective shafts 10, 11, there being provided a pair of set screws 16, 17 that extend through the respective hubs and into a pair of keyways 18, 19 in the shafts. Thus, the coupler members 12, 13 are fixed to rotate with their respective shafts. The coupler members 12, 13 also include radially projecting flanges 20, 21 with adjacent radial surfaces 22, 23 on opposite sides of an axial gap. The flanges 20, 21 have axial openings 24, 25 that are axially aligned across the aforesaid gap. Each of the openings 24, 25 diverge conically outwardly from a comparatively narrow central part. Thus each opening is composed of aligned frusto-conical surfaces. Seated in the openings are frusto-conical shaped inserts or liners 26 of an elastomer material. The flanges also have outer peripheral annular surfaces 27, 28 and inner annular axially extending surfaces 29, 30 formed by recesses extending axially into the respective flanges 20, 21 from the radial surfaces 22, 23.

Figure 1:
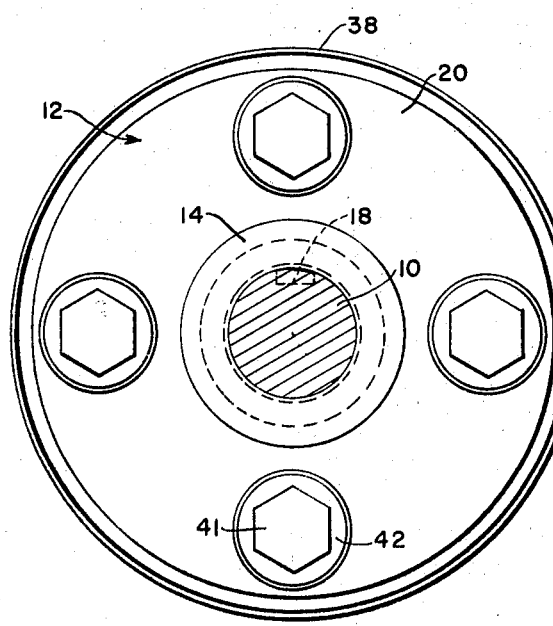
FIG. 1 is an end view of the preferred form of the coupler device mounted on a pair of axially aligned shafts.

A metal ring or collar member, indicated in its entirety by the reference number 35, is positioned between the flanges 20, 21 and includes a radially extending flange portion 36 positioned in the gap between surfaces 22, 23, and integral inner and outer annular ring or collar portions 37, 38 respectively. Opposite edges of ring portion 37 fit in the annular recesses forming the surfaces 29, 30 and the outer surfaces of the ring portion 37 engage and serve to pilot the flanges 20, 21 thereon. Similarly the ring portion 38 has its opposite edges overlying the respective outer annular surfaces 27, 28 of flanges 20, 21. The ring portion 38 has inner axially extending annular surfaces that overlie the surfaces 27, 28 and consequently the ring portion and flanges 20, 21 pilot on one another. The flange portion 36 has a plurality of openings 39 that are axially aligned with the respective openings 24, 25 of flanges 20, 21.

A plurality of axially extending rigid connector elements in the form of bolts 40 extend through the elastomer inserts 26 and the openings 24, 25 and 39. Each bolt 40 has a head end 41 with a metal washer 42 that bears against insert 26 in opening 24. A nut 43 and washer 44 are provided on the opposite end of each bolt 40 and bears against an elastomer liner 26 in opening 25. When the nuts 43 are tightly drawn on the bolts 40, the liners or inserts 26 deform from a complete frusto-conical shape to that shown in FIG. 2 in which small beads are formed between the respective washers 42, 44 and the outer surfaces of flanges 20, 21 and the inner surfaces 22, 23 of the flanges and opposite sides of flange 36. When the liners 26 are so compressed opposite end portions of bolts 40 are mechanically held or imbedded in a resilient elastomer. The bolts 40 and nuts 43 serve as means for connecting the flanges 20, 21 and the inserts or liners 26 serve to provide flexibility or resiliency in the connecting means.

In operation, any small misalignment of the two shafts 10, 11 is resisted by the ring portions 37, 38 engaging the inner annular surfaces 29, 30 and outer annular surfaces 27, 28 of the respective flanges. However, the inserts 26 will yield or flex upon excessive torque loads being applied or upon relative axial movement between the shafts 10, 11. Therefore, should a momentary shock load or overload occur between the two shafts, the flexible coupling will yield sufficiently to accommodate it. Also, due to the inserts being resilient, the coupling will tend to move the coupler members 12, 13 into proper registry with one another when the shock or overload has subsided.

Figure 3:
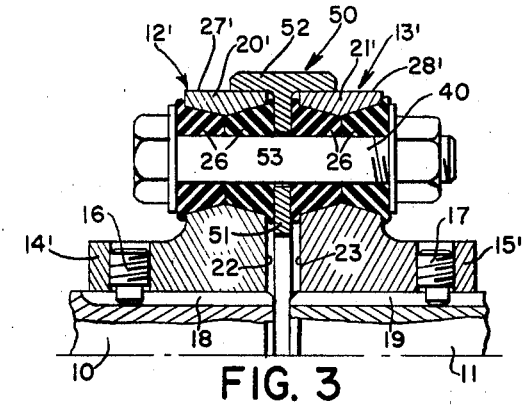
FIG 3 is a sectional view similar to the upper portion of FIG. 2 of a modified form of the invention.

In the form of the invention shown in FIG. 3, the coupling members 12' and 13' are slightly different than those of the previous form in that they do not have the inner annular recesses extending from the radial faces 22', 23' of the respective flanges. They have hub portions 14', 15' fixed to shafts 10, 11 by set screws 16, 17 that seat in keyways 18, 19. Flanges 20', 21' are provided with axially extending annular and peripheral surfaces 27', 28' respectively. A ring or collar member 50 has a radial flange portion 51 disposed between surfaces 22', 23' and an integral outer annular ring portion 52 that extends to opposite sides of the flange portion 51 and overlies the respective outer surfaces 27', 28' of the respective flanges. As in the previous form of the invention, the collar portion 51 pilots or guides on the outer surfaces 27', 28. Bolts 40 extend between the flanges 20', 21' and have opposite end portions imbedded in elastomers liners 26 in identical fashion as that of the previous form of the invention. Bolt openings 53 are provided in the flange 51 to pass the bolts 40.

Figure 2:
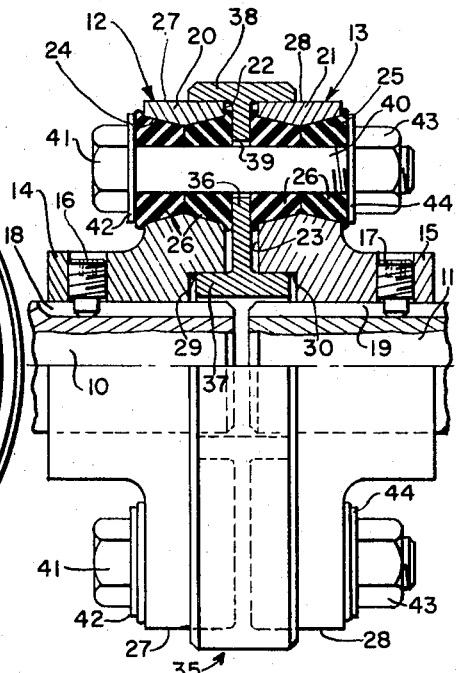
FIG. 2 is a side view of the coupler device shown in FIG. 1 with the upper half of the device being shown in section.
Figure 4:
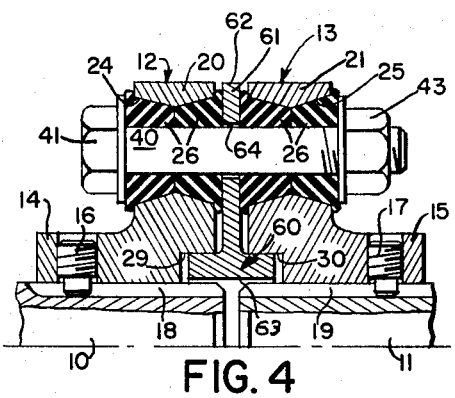
FIG. 4 is a sectional view similar to the upper portion of FIG. 2 of a further form of the invention.

In the form of the invention shown in FIG. 4, the coupler members 12, 13 are identical to that of the form of the invention shown in FIGS. 1 and 2 and consequently parts thereof are given identical reference numbers. The particular difference in the coupling device lies in the shape of the ring member 60. The member 60 has a radial flange portion 61 with an outer annular edge 62 substantially aligned with the edges 27, 28 of flanges 20, 21. The member 60 has an inner ring portion 63 integral with and extending to opposite sides of the flange 61. The opposite edge portions of the ring portion 63 are received in the recesses that form the annular axially extending surfaces 28, 29, and the surfaces 28, 29 ride upon or pilot on the annular ring portion 63. The flange 61 is provided with openings 64 for passing bolts 40. The entire device is assembled in the same manner as the previous forms with slight exception being due to the slight modification of the structure.

Figure 5:
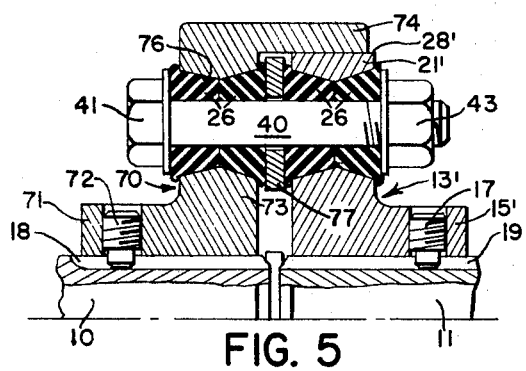
FIG. 5 is a sectional view similar to the upper portion of FIG. 2 of still a further form of the invention.

In the form of the invention shown in FIG. 5, the right-hand coupler member is identical to the right-hand coupler member 21' shown in FIG. 3 and consequently it is given the same reference numbers. The left-hand coupler member 70 is provided with a hub 71 having a set screw 72 that seats in keyway 18 and locks the member 70 to shaft 10. The coupler member 70 has a radial flange portion 73 that extends outwardly to an integral and axially extending annular flange portion 74 extending across the axial gap between flanges 21' and 73. The portion 74 has an internal annular surface 75 that outwardly overlies the annular surface 28' of the coupler member 21' and is engageable therewith to guide or pilot the two members 70 and 21' in an axial direction. The flange 73 is provided with axial openings 76, identical to the openings 24 in the previous form of the invention, that receive elastomer inserts 26. Bolts 40 extend between the flanges 21', 73 and connect the two flanges together. Carried on the bolts 40 between the inner of the elastomer inserts 26 is a metal spacer or washer 77 which serves as a metal base on which to compress each of the inserts 26.

There are many factors that determine which form of the invention should be used. For example, the forms shown in FIGS. 2 and 4 require an additional machining operation to form surfaces 29, 30 and consequently would be slightly more expensive. Units shown in FIGS. 2, 3 and 5 require additional space since the flanges 38, 52 and 74 are radially outwardly of the coupler members. These and other factors will enter into the question of determining just which form of device is preferable for the particular installation. Each installation will have particular conditions and circumstances which will dictate that form of the invention that should be used.

What is claimed is:

1. A coupling device for drivingly connecting a pair of axially aligned shafts comprising: a pair of coupler members mounted to rotate with the respective shafts and extending radially therefrom, with at least one of the coupler members having an axially extending annular guide surface formed about the shaft axis; a plurality of rigid elements extending between and for drivingly connecting the coupler members to one another and having their ends imbedded in elastomer material supported by the coupler members for permitting flexing between the coupler members; and a guide extending between the coupler members with an axially extending ring portion complementary to and engageable with the annular guide surface whereby the coupler member with the annular guide surface and guide may pilot against one another.

2. The structure as set forth in claim 1 whereby the guide includes a radial flange portion diseposed between the coupler members and integral with the ring portion.

3. The structure as set forth in claim 1 in which the guide is rigid with the coupler member not having the annular guide surface and extends axially therefrom to pilot on the annular guide surface.

4. The structure as set forth in claim 1 in which both of the coupler members have axially extending annular guide surfaces axially aligned with one another, and the guide extends between the coupler members and has its ring portion piloted on both guide surfaces.

5. The structure as set forth in claim 4 in which the guide has an integral radially extending flange portion disposed between the coupler members.

6. The structure as set forth in claim 5 in which the rigid elements extend axially between the coupler members and the flange portion has openings therein for passing the rigid elements.

7. The structure as set forth in claim 1 in which the coupler members have radial flanges spaced apart axially with axially aligned axial openings for receiving the rigid elements, and both of the flanges have outer axially extending annular surfaces; and the guide includes a radial flange disposed between the flanges of the coupler members with openings therein axially aligned with the openings of the members for passing the rigid elements, and the ring portion is an outer ring portion extending to opposite sides of the guide flange, and the ring portion has internal axially extending annular surfaces that telescopes outwardly of and over the annular surfaces of both flanges.

8. The structure as set forth in claim 1 in which the coupler members have radial flanges spaced apart axially with axially aligned axial openings for receiving the rigid elements, and both of the flanges have internal axially extending annular surfaces; and the guide includes a radial flange disposed between the flanges of the coupler members with openings therein axially aligned with the openings of the members for passing the rigid elements, and the ring portion is an inner ring portion extending to opposite sides of the guide flange, and the ring portion has axially extending annular surfaces that telescopes in respect to the annular surfaces of both flanges.

9. The structure as set forth in claim 1 in which the coupler members have radial flanges spaced apart axially with axially aligned axial openings for receiving the rigid elements, and both of the flanges have internal and external axially extending and aligned annular surfaces; and the guide includes a radial flange disposed between the flanges of the coupler members with openings therein axially aligned with the openings of the members for passing the rigid elements, and the guide includes both inner and outer ring portions extending to opposite sides of the guide flange, and the ring portions have axially extending annular surfaces that telescopes respectively with the internal and external annular surfaces of the flanges of both coupler members.

10. A coupler device for drivingly connecting a pair of axially aligned shafts comprising: a pair of coupler members mounted to rotate with the respective shafts and having radially extending flanges spaced axially apart to define an axial gap, the flanges having axially aligned axially extending openings, and further having axially extending and aligned annular surfaces formed about the shaft axis; a rigid ring member having ring and radial flange portions with the former extending across the gap between the flanges and being piloted on the respective annular surfaces of the flanges, and the radial flange portion being integral therewith and disposed in the gap between the flanges of the coupler members and having openings therein aligned with the openings in the coupler members; rigid connector elements extending through the aligned openings of the flanges and flange portion for drivingly connecting the coupler members; and elastomer liners in the flange openings for affording yieldable support for the elements in the flanges.

11. The structure as set forth in claim 10 in which the flanges of the coupler members have adjacent radial faces, and the respective annular surfaces are formed by recesses in the respective flanges extending axially from the faces, and the ring portion has opposite edge sections disposed in the recesses.

12. The structure as set forth in claim 10 in the flanges of the coupler members have the respective annular surfaces formed by the outer peripheries of the respective flanges, and the ring portion has opposite edge sections outwardly overlying the annular surfaces.

13. The structure as set forth in claim 10 in which the flanges of the coupler members have adjacent radial faces and the respective annular surfaces are inner and outer surfaces with the inner surfaces being formed by recesses in the respective flanges extending from the radial faces and the outer surfaces are the outer peripheries of the respective flanges, and the ring member has inner and outer ring portions with the outer of the ring portions being in an outwardly axially overlapping relation to the outer surfaces and the inner of the ring portions being recessed in the recesses forming the inner surfaces.

14. The structure as set forth in claim 10 in which the elastomer liners extend into the gap between the flanges of the coupler members and engage opposite sides of the flange portion of the ring member.

References Cited

UNITED STATES PATENTS

| | | | |
|---|---|---|---|
| 2,326,451 | 8/1943 | Fawick | 64—11 |
| 2,449,654 | 9/1948 | Jessop | 64—27 X |
| 2,879,650 | 3/1959 | Martin | 64—10 |
| 3,199,315 | 8/1965 | Morse | 64—27 |
| 3,304,743 | 2/1967 | Paulsen | 64—11 |

HALL C. COE, Primary Examiner